Figure 1:
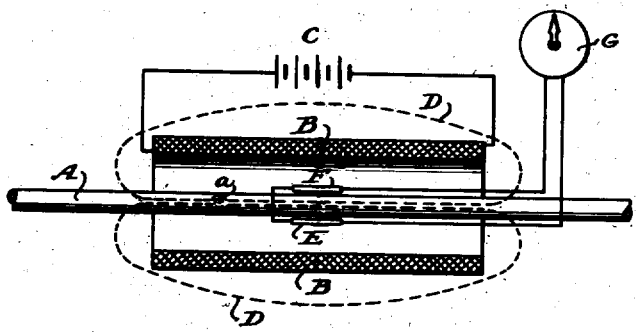

June 17, 1924.

C. W. BURROWS

Re. 15,859

METHOD OF AND APPARATUS FOR TESTING MAGNETIZABLE OBJECTS BY MAGNETIC LEAKAGE

Original Filed Oct. 4. 1917 3 Sheets-Sheet 1

INVENTOR
Charles W. Burrows
BY
H. Russell Bond
ATTORNEY

June 17, 1924.

C. W. BURROWS

Re. 15,859

METHOD OF AND APPARATUS FOR TESTING MAGNETIZABLE OBJECTS BY MAGNETIC LEAKAGE

Original Filed Oct. 4, 1917 3 Sheets-Sheet 2

INVENTOR
Charles W. Burrows
BY
A. Russell Bond
ATTORNEY

June 17, 1924.

C. W. BURROWS

Re. 15,859

METHOD OF AND APPARATUS FOR TESTING MAGNETIZABLE OBJECTS BY MAGNETIC LEAKAGE

Original Filed Oct. 4, 1917 3 Sheets-Sheet 3

INVENTOR
Charles W. Burrows
BY
H. Russell Bond
ATTORNEY

Reissued June 17, 1924.

Re. 15,859

UNITED STATES PATENT OFFICE.

CHARLES W. BURROWS, OF SOUTH ORANGE, NEW JERSEY, ASSIGNOR, BY DIRECT AND MESNE ASSIGNMENTS, TO BURROWS MAGNETIC EQUIPMENT CORPORATION, OF JERSEY CITY, NEW JERSEY, A CORPORATION OF DELAWARE.

METHOD OF AND APPARATUS FOR TESTING MAGNETIZABLE OBJECTS BY MAGNETIC LEAKAGE.

Original No. 1,322,405, dated November 18, 1919, Serial No. 194,756, filed October 4, 1917. Application for reissue filed March 14, 1924. Serial No. 699,302.

*To all whom it may concern:*

Be it known that I, CHARLES W. BURROWS, a citizen of the United States, and a resident of South Orange, in the county of Essex and State of New Jersey, have invented a new and Improved Method of and Apparatus for Testing Magnetizable Objects by Magnetic Leakage, of which the following is a full, clear, and exact description.

This invention is a novel method of and apparatus for detecting the presence of inhomogeneities in magnetizable metal bodies, and such as rods, cables, rails, etc.

The method consists in the determination of variation in one or more of the magnetic properties of a body of magnetizable material, which variation may exist between different parts of the specimen examined, and is based upon the principle that there is one and only one set of mechanical characteristics corresponding to a given set of magnetic characteristics, and conversely there is one and only one set of magnetic characteristics corresponding to a given set of mechanical characteristics.

In the practical application of this method each element of length of the specimen is subjected to the action of a magnetic field. This may be accomplished either by causing the field to move over the specimen or the specimen to move through the field. If the magnetic field be kept constant any variation in magnetic induction will be due to a corresponding variation in material and the change in induction may be measured by means of a detecting device comprising one or more test coils which move relatively to the specimen. However, owing to the difficulty of maintaining a uniform magnetic field, I so arrange my detecting device as to be sensitive solely to leakage lines and insensitive to variations or fluctuations in field.

An essential feature of the method is that the test coil is placed within the magnetic field and the current in the detector coils is produced or varied solely by magnetic leakage in the lines of force in the specimen being tested, any flaw or inhomogeneity in the specimen causing a deflection or leakage lines of force, and disturbing the lines of force which normally pass through each element of the length of the specimen undergoing inspection if the same is perfect.

In other words, in carrying out the method, each element of length of the specimen to be inspected is subjected to magnetization by a magnetic field, the test coil or coils are placed within this magnetic field adjacent the specimen and relative motion is produced between the magnetic field with the test coil and the specimen, and so long as the specimen is uniform there is no change from section to section of said specimen in the parallel flow of lines of force, but wherever an imperfection, inhomogeneity or flaw occurs in the specimen, a leakage occurs, which leakage eruption or irruption of lines of force will link through the test coil and produce a current in such test coil which current may be indicated by a suitable apparatus and may be recorded or announced; thus, the existence of such flaws can be demonstrated visually, and also may be recorded if desired, and actually located in the specimen.

Various apparatus may be designed for carrying out the method aforesaid; and in the accompanying drawings, I have shown apparatus especially designed for testing cables, rods, rails and other long magnetizable bodies by this method, and the invention is hereinafter more fully explained with reference to said drawings to enable others to readily understand, adapt and use my invention, and the claims summarize the essentials of the invention and novel features of construction and combination of parts of the apparatus for which protection is desired.

Figure 2:
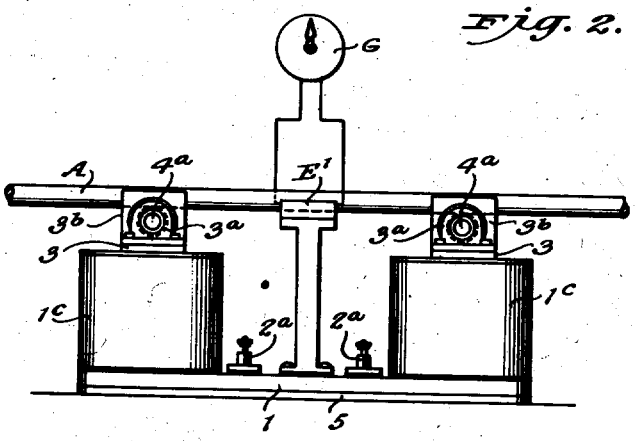
Figure 3:
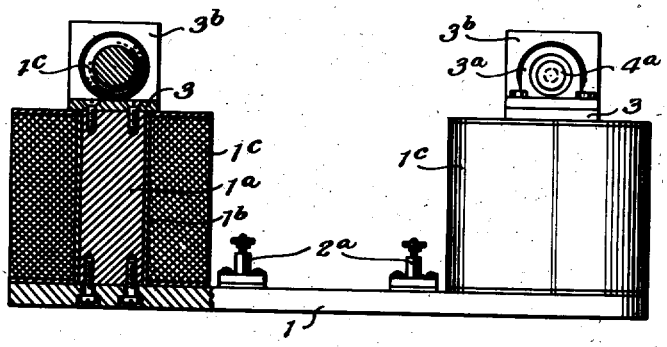
Figure 4:
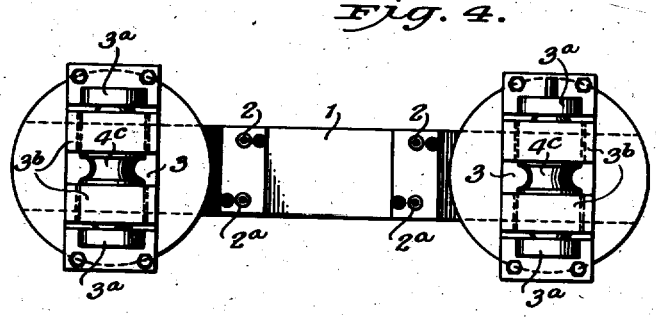
Figure 5:
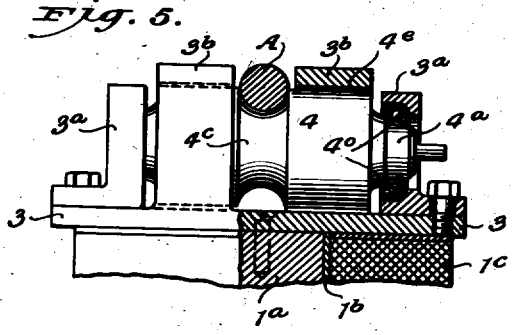
Figure 6:
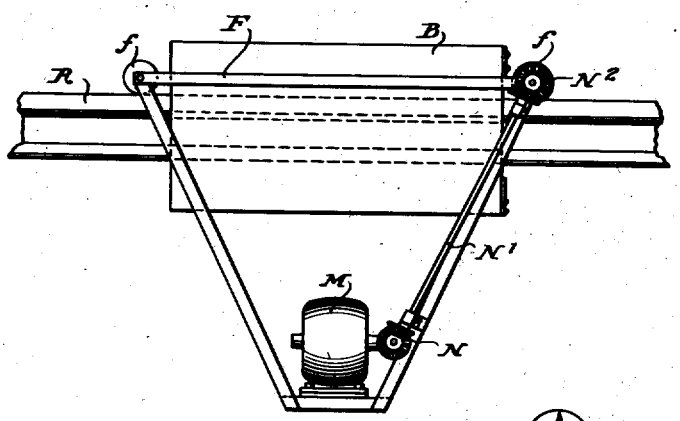
Figure 7:
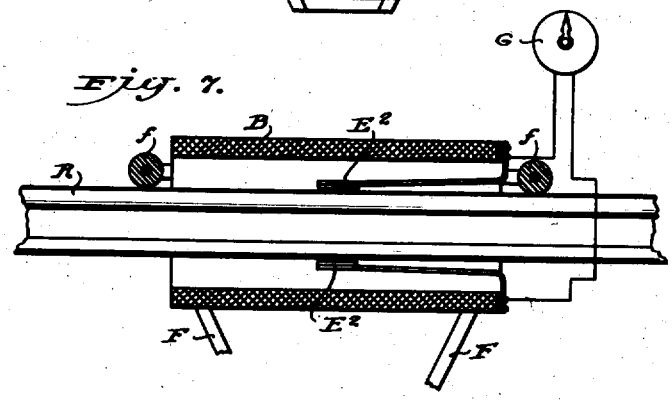

In said drawings,

Fig. 1 is a diagrammatic view of a testing apparatus,

Fig. 2 is a side elevation of one practical form of apparatus for carrying out the invention, Fig. 3 is an enlarged part side elevation and part sectional view through the main magnet of the apparatus shown in Fig. 2, Fig. 4 is a top plan view of Fig. 3, Fig. 5 is an enlarged end view and part sectional view showing one of the rotatable magnetic poles, Fig. 6 is a diagrammatic elevation of a modified form of the apparatus, Fig. 7 is a sectional elevation of the part of Fig. 5, showing the major coil and a detecting coil, Figs. 8, 9, 10 and 11 are detail views illustrating some of the various possible arrangements of test coils related to the object being tested.

In practically using my invention means are provided for magnetizing the specimen, or successive portions of the specimen to be tested if it be long, like a rod or cable for example, and in connection therewith detecting means or test coils are provided located within the magnetic field and preferably closely adjacent the specimen, the detecting means or test coils being kept stationary relatively to the main magnet, or magnetic field; and then producing a relative movement between the specimen and such test coil either by moving the magnetic field and test coil along the specimen being tested, or moving the specimen through or past the magnetic field and test coil.

To simplify the explanation of the invention and facilitate an understanding thereof, I will first describe a very simple form of apparatus for testing rods or cables, and thereafter explain the at present preferred form of apparatus for testing mine cables.

Referring to the diagram, Fig. 1, A represents a specimen bar, rod, cable or like object of iron, steel or other magnetizable metal. Preferably surrounding this specimen is a solenoid B, which is connected with a suitable source of electricity, indicated at C, by which the solenoid is energized and caused to produce a powerful magnetic field around and in the portion of the specimen A within the solenoid. I have shown a solenoid in Fig. 1, but any other suitable electro-magnet or magnets might be used, so arranged adjacent the specimen A so as to produce a magnetic field therein. The lines of force of such magnetic field are conventionally indicated by the dotted lines D. Within this magnetic field and arranged close to the object A are one or more test coils E, and these test coils may be arranged either parallel with or at angles to the axis of the specimen, said test coils E are insulated from the solenoid and are connected with a galvanometer or other indicating device G, which should be a sensitive instrument. If a single test coil E is used, it must be positioned with its axis normal to the axis of magnetic flux passing through the specimen, so that variations in the magnetizing current passing through coil B will not produce any indication in the instrument G. If two or more test coils are used in series, they may be placed at any angle with respect to the axis of the body of magnetic flux, but if the axes of the coils are not normal to the axis of magnetic flux, the coils must be bucked so that the instrument G will not respond to variations of the magnetizing current, but will respond solely to leakage lines of force that deviate from the main body of magnetic flux. No current will be produced in the test coil E, so long as the specimen A is perfect and the fixed relation between the test coil E and the primary coil or magnet B is maintained, the parts being in the positions shown in Fig. 1.

If the magnetizing system be simultaneously moved longitudinally of the specimen, or the specimen be moved relatively to the magnets through the magnetic field, there will be no deflection of the galvanometer or the indicating device G produced provided the specimen is uniform throughout; but if in the course of this movement there should be a flaw or other defect in the specimen A, when such flaw enters the magnetic field it causes an eruption or irruption or leakage, of the lines of force in the specimen. For instance, if there should be a flaw in the specimen at the point marked *a* in Fig. 1, there will be a leakage of lines of force at such point and when it passes the test coil E, these leaking lines of force, will affect the coils E, and produce a change of electromotive force and current therein, and if a suitable indicating or recording device is provided at G the presence of such flaw or inhomogeneity will be detected by reason of such change of electromotive force in the coil and can thus be located in the specimen. If a suitable indicator is provided its pointer will move in one direction as the flaw approaches the test coils E and in a reverse movement as the flaw leaves the test coils E. If the specimen contains more than one flaw or inhomogeneity each will be thus detected, and the larger the inhomogeneity the greater will be the deflection or disturbance of the indicator G. This action is based upon the premise or upon the fundamental fact of observation above stated—to wit "that there is one, and only one set of mechanical characteristics corresponding to a given set of magnetic characteristics, and conversely there is one, and only one, set of magnetic characteristics corresponding to a given set of mechanical characteristics".

I am aware that it has heretofore been proposed to test metallic objects by passing them through a magnetic field, such as is produced by the solenoid B for example, the solenoid being connected in circuit with an indicator or ammeter and fluctuations of the ammeter indicating some flaw or inhomogeneities in the object; but such apparatus is inefficient and unreliable, because only very large inhomogeneities or flaws can be detected thereby, and even these cannot be detected with certainty because the effect or variation in the current through the solenoid B caused by even considerable inhomogeneities in the specimen A relatively is very minute.

In my invention I do not employ variations in the exterior solenoid or magnetic field producing means for determining defects in the specimen, but instead I use an independent or separate detecting means which is affected directly and solely by variations in the leakage of magnetic lines of force in the specimen, such leakage occurring at any point of the specimen where a flaw or inhomogeneity exists, and such leaking lines of force being directly cut by the test coils and producing a relatively violent action of the galvanometer or indicator; and in practice by my method and apparatus I can detect flaws or inhomogeneities in specimens which it would be impossible to detect by connecting the solenoid B with an ammeter.

I am aware also that attempts have been made to detect inhomogeneities by using test coils which are affected directly by variations in the totality of magnetic lines of force, but these attempts have proved impracticable, because the coils were not so positioned or so coupled as to be insensitive to variations other than those produced by inhomogeneities in the specimen under test. In the arrangement illustrated in Fig. 1, fluctuations of current in the energizing coil B will produce no effect on the indicating instrument G, because the coils E lie edgewise to the normal magnetic flux generated in the specimen A, but when a flaw *a* is encountered, the flux is distorted and lines of force which are projected out of parallel with the main body of the flux are linked through the coils E and produce an indication in the instrument G. This instrument, therefore, is affected solely by disturbances indicative of inhomogeneities or flaws in the specimen. So insensitive are the test coils, as I arrange them, to variations in the magnetizing current in coil B that there is no appreciable deflection of the needle in instrument G even when coil B is connected to or disconnected from the source of current C, whereas with apparatus heretofore used, the sudden variation in flux produced by connecting or disconnecting the magnetizing coil to the source of current would result in inducing currents in the test coils of such strength as would be likely to impair or seriously strain the delicate indicating instrument connected in series with the test coil.

In commercial practice, it is impossible to maintain an absolutely uniform flow of current and with detecting apparatus as heretofore proposed, no provision has been made to prevent variations in flux produced by variations of the magnetizing current from affecting the test coils. The essentially novel feature of my method of and apparatus for testing magnetizable objects by magnetic leakage consists in so arranging the test coils that they will be insensitive to any variations of flux except variations that result in lines of force that deviate from the direction of travel of the main body of flux.

The employment of such detecting means or test coils in a magnetic field so positioned or so coupled as to be affected solely by the leakage of lines of force into or from the specimen in the manner stated, is the essentially novel feature of my method and apparatus for carrying out such method.

The apparatus shown in Figs. 2–5 is particularly designed for testing mine and elevator cables, rods, etc., and I will explain such apparatus and the manner of using same for testing cables to further elucidate the practical value of the invention.

Referring to Figs. 2–5, 1 designates an iron base plate or yoke to the opposite ends of which are securely attached iron cores $1^a$, on which may be placed brass spools $1^b$ wound with wire $1^c$, these spools and cores forming with the yoke a powerful electromagnet. The terminals of the coils may be suitably connected to binding posts 2 and $2^a$ of any suitable kind attached to the yoke 1, so that the said coils may be readily connected with any suitable source of electricity to energize the same as will be readily understood by those skilled in the art.

To the upper end of each core $1^a$ is connected a head 3, which is provided with supports $3^a$ for a rotatable pole-piece 4, which pole-piece has trunnions $4^a$ preferably supported by ball or roller bearings 40 in the supports $3^a$ so that the pole-piece can freely rotate on the head 3. The pole-piece extends through cylindric openings in projections $3^b$, formed integral with the heads 3 and intermediate the supports $3^a$, said projections having openings for the passage of the pole-piece 4 and slightly greater in diameter than the external diameter of the pole-piece which extends therethrough, see Fig. 5, so that there is a slight air gap, indicated at $4^e$, between the pole-piece 4 and the surrounding walls of projections $3^b$ and consequently there is no actual frictional or sliding contact between the pole-piece and the head; and the pole-piece while strongly magnetized is not locked against rotation.

The yoke 1 can be attached to any suitable support adjacent the run of the cable C, so that the cable will lie in the grooves $4^c$ and run successively from one pole-piece to the other. Each pole-piece is preferably provided with a groove $4^c$ intermediate the projections $3^b$ which groove serves to guide the cable C, or other specimen being tested, and the pole-pieces being strongly magnetized attract and hold the cable in the grooves $4^c$ while permitting the cable to freely move endwise therepast.

When the magnet is energized a magnetic field will be established and there will be a flow of lines of force between the pole-pieces 4 and through that section of the cable lying intermediate the pole-pieces 4, which section will be strongly magnetized and whether the cable be moved through the magnetic field or the magnetic field be moved along the cable the section of the cable at any time intermediate the pole-pieces 4 will be magnetized in substantially the same manner that the section of the specimen A within the solenoid B (Fig. 1) is magnetized.

Intermediate the pole-pieces 4 is arranged a detecting means or test coil or coils E; such test coils may be variously shaped and located. As shown in Fig. 2 a rectangular coil E′ is preferably bent to partially surround the cable C and arranged to lie close thereto without actually contacting therewith. However, it is essential that coil E′ be located intermediate between the pole pieces 4 at a point where the magnetic flux is practically undisturbed by fluctuations which might arise from slight variations of contact between the specimen and the pole pieces. The terminals of this test coil E′ are connected with any suitable electric indicating or recording device G, adapted to indicate changes of electromotive force in the test coil. The construction of such indicator or recorder is not a feature of the present invention and can be selected by the constructor or engineer building or using the apparatus.

So long as the successive portions of the cable or specimen extending between the pole-pieces 4 are uniform and perfect the test coil E′ will not be affected, and there will be no deflection of the indicator G. If, however, there is a flaw or defect in any part of the cable, as soon as such defect enters the magnetic field and approaches the testing means or coil E′, the latter will be affected by the leakage of lines of force in the specimen at such defect and the change in electromotive force in the test coil will cause a deflection of the indicator in one direction as the defect approaches the coil and in the reverse direction as the defect leaves the coil.

From the foregoing it will be understood that with such detecting or testing method and apparatus the entire length of the cable can be easily explored and any defects therein detected and located. In practice one or more of such testing apparatus could be installed permanently at any suitable point or points in the run of the cable, and tests thereof be made continuously or at frequent intervals, as desired; and when a defect arises in the cable such defect can be detected and located in the cable.

Such apparatus could be used for testing rails, rods, or other magnetizable objects having considerable length. If such apparatus should be used for testing rods or rails, the apparatus could itself be moved along the rails instead of moving the rail past the apparatus.

A simple form of apparatus for testing rails or bars is shown in Figs. 6 and 7. As shown in these figures a solenoid B is attached to a frame F provided with rollers *f* at its ends so that the solenoid can be slipped over a bar or rail, indicated at R, and be movably supported thereon by the rollers *f*. The frame F may carry an electric motor M which is operatively connected by suitable gearing and shafting such as N, $N_1$, $N_2$, with one of the rollers *f*, and when the motor is running it will propel the frame and solenoid lengthwise of the rail. Within the solenoid are arranged one or more test coils $E^2$ which are suitably electrically connected with an indicator or recorder G. When the current is turned on and the main magnet energized the apparatus is caused to travel along the rail and any defect or inhomogeneity in the rail will be detected in the manner described.

Figure 8:
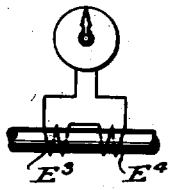
Figure 9:
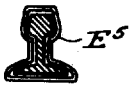

One or more test coils may be employed according to the nature or contour of the specimen being tested, and such coils may be arranged either with their axis parallel with or at angles to the longitudinal axis of the specimen being tested; but such test coils should be so arranged adjacent the specimen that they will intercept or cut lines of force leaking from such specimen.

Where it is feasible to surround the specimen with a test coil I prefer to have the test coils arranged with their axes parallel with the axis of the specimen and close thereto as in Fig. 8; and in some cases I prefer to use a plurality of test coils wound in series but oppositely as indicated in Fig. 8; wherein test coil $E^3$ is preferably wound oppositely to test coil $E^4$. If the specimen is regular, the coils might be shaped to conform to the specimen as indicated in Fig. 9. A plurality of flat coils may be placed around adjacent the specimen within the magnetic field so as to conform as nearly as possible to the cross section contour of the specimen to be tested.

It will be evident that a coil placed edgewise to the direction of flux is the electrical equivalent of two coils surrounding the specimen, but with their windings reversed so that one coil bucks the other coil, for, in the first case, we have two bucking elements by reason of the fact that electromotive force induced in one half of the coil that lies edgewise to the flux is bucked by electromotive force induced in the other half of the coil. However, lines of force that leak out of the specimen and hence out of parallel with the direction of the main body of the flux, will pass through the coil and induce electromotive force of opposite potential in opposite sides of the coil, thereby inducing a flow of current which is indicated in the instrument G. If the test coils are arranged as in Fig. 8, leakage lines will pass through one coil without affecting the other or will pass first through one coil and then through the other; hence, inducing currents in these coils which will be indicated on the indicating instrument.

Figure 10:
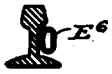
Figure 11:
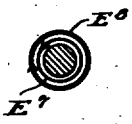

In some cases, the coils may be arranged beside the specimen with their axes parallel with the axis of the specimen as indicated in Fig. 10, wherein coil $E^6$ is arranged beside the web of the rail. In such cases, however, two coils $E^6$ must be employed, one bucking the other so that the coils will not be responsive to any fluctuations except those of leakage lines that are intercepted. The test coils might in some cases be advantageously arranged, one inside the other as in Fig. 11, where an inner test coil $E^7$ surrounds the object, and is in turn surrounded by an outer test coil $E^8$, the said coils $E^7$ and $E^8$ being oppositely wound and connected in series. In such cases, the normal flux passes through both coils and any variations in this flux will result in induced electromotive forces which oppose each other and hence give no reading on the instrument, but when leakage lines are intercepted they will, as they pass out of the inner coil and through the outer coil, induce electromotive force that will be indicated on the instrument.

I do not consider my invention restricted to any particular construction or relative arrangement of test coils, the essential being that a suitable test coil, or detecting means, be located adjacent the specimen being tested and within the magnetic field so that said test coils or detecting means will be affected solely by the leakage of magnetic lines of force in, from or to said specimen.

I claim:

1. The method of detecting inhomogeneities in magnetizable objects consisting in placing the object in a magnetic field, placing in said magnetic field a testing means insensitive to variations in the main body of magnetic flux, and observing electrical characteristics induced in said testing means by leakage lines of force from said object.

2. The method of detecting inhomogeneities in magnetizable objects consisting in placing the object in a magnetic field, placing in said magnetic field a testing means insensitive to variations in the main body of magnetic flux, producing relative movement between said object and said testing means and observing the electrical characteristics induced in said testing means by leakage lines of force departing from or entering into said object.

3. The method of directing inhomogeneities in magnetizable objects consisting in placing the object in a magnetic field, placing in said magnetic field adjacent the body a test coil insensitive to variations in the main body of magnetic flux, and observing variations in electrical characteristics induced in said test coil by leakage of lines of force from or into said object.

4. The method of detecting inhomogeneities in magnetizable objects consisting in placing the object in a magnetic field, placing a test coil in said magnetic field adjacent the body, rendering said test coil insensitive to variations in the main body of magnetic flux, producing relative movement between said object and said testing means, and observing the characteristics of the current induced in said testing means by leakage lines of force departing from or entering into said object.

5. The method of detecting inhomogeneities in magnetizable objects consisting in placing the object in a magnetic field, placing in said magnetic field adjacent the body a test coil having certain elements thereof bucked against other elements thereof with respect to electromotive force induced therein by variations of the normal flux of said field, producing relative movement between said object and said test coil, and observing characteristics of the current induced in said test coil solely by lines of force leaking out of or into said object.

6. The method of detecting inhomogeneities in magnetizable objects consisting in placing the object in a magnetic field, placing electrical conductors in said field adjacent the object, said conductors being connected in bucked relation with respect to electromotive force induced therein by variations in the normal flux of said field, producing relative movement between the object and said conductors, and observing characteristics of the current induced in said conductors by leakage of lines of force from or into said object.

7. The method of detecting inhomogeneities in magnetizable objects, consisting in subjecting successive sections of such a body to the action of a magnetic field, placing in the magnetic field and adjacent the body a detecting means insensitive to variations in the main body of magnetic flux, producing relative movement between the detecting means and the body within said field, and observing fluctuations of electromotive force induced in the detecting means by the change in leakage of lines of force from the body intercepted by said testing means.

8. The method of detecting inhomogeneities in magnetizable specimens consisting in producing a magnetic field, subjecting successive portions of such specimen to said field by producing relative movement of said field along the length of the specimen, placing within said field and adjacent the surface of the specimen a test coil insensitive to variations in the main body of magnetic flux, and observing the variations in current from said test coil produced by leakage of magnetic lines of force from or into said specimen during the relative movement of such specimen and test coil.

9. The method of detecting inhomogeneities in magnetizable specimens consisting in producing a magnetic field, subjecting successive portions of such specimen to said field by producing relative movement of said field along the length of the specimen, placing within said field and adjacent the surface of the specimen a test coil having certain elements thereof bucked against other elements thereof so that no flow of current will be induced in the coil by variations in the main body of magnetic flux, and observing variations in the electromotive force from said test coil produced solely by variations in the leakage of magnetic lines of force from or into said specimen during the relative movement of said specimen and test coil.

10. The method of detecting leakage of lines of force from a fluctuating magnetic field which consists in placing a test coil in the field with the axis of the coil normal to the main body of magnetic flux, and observing the electrical characteristics of the current induced in the coil by lines which deviate from the main body of flux and link through the coil.

11. The method of detecting leakage of lines of force from a fluctuating magnetic field which consists in placing two coaxial coils in the field, one coil being bucked against the other, and observing electrical characteristics of the current induced in the test coils as they are successively cut by lines of force that deviate from the main body of magnetic flux.

12. Apparatus for detecting inhomogeneities in magnetizable objects, means for magnetizing a body, detecting means in the magnetic field adjacent the body, said detecting means comprising conductors connected in bucked relation with respect to electromotive force induced therein by variations in the normal flux of said field, and means for indicating electrical characteristics of current produced in the detecting means by leakage of lines of force from said body.

13. Apparatus for detecting inhomogeneities in magnetizable objects, means for producing a magnetic field around an object, a test coil with its axis perpendicular to the normal flux of the magnetic field, and means for indicating the electrical characteristics of current induced in said coil by leakage of lines of force from said object.

14. Apparatus for detecting inhomogeneities in magnetizable objects, means for producing a magnetic field around an object, a detecting circuit comprising two elements connected in electrically opposed relation with respect to variations in the normal flux of the magnetic field, and means for indicating electrical characteristics of current induced in said coil by leakage of lines of force from said object.

15. Apparatus for detecting inhomogeneities in magnetizable objects, means for producing a magnetic field around said object, two coils surrounding the object, said coils being connected in series but being oppositely wound, means for producing movement between said object and detecting means, and means for indicating electrical characteristics of current induced in said coils by leakage of lines of force from said object.

16. Apparatus for detecting inhomogeneities in magnetizable objects, comprising means for producing a magnetic field around the specimen to be tested, a test coil within said magnetic field adjacent the specimen, said test coil comprising elements that are bucked with respect to electromotive force induced by variations in the main body of magnetic flux, said magnetic field and the specimen being relatively movable whereby successive portions of the length of the specimen are successively energized, and means for detecting electrical characteristics of the current from said test coil produced by leakage of lines of force from the specimens.

17. Apparatus for testing cables and the like, means for magnetizing the cable, means for producing relative movement of the resultant magnetic field longitudinally of the cable, detecting means in said field adjacent the cable, said means being insensitive to variations of magnetic flux surrounding the cable and means for indicating variations of the electromotive force induced in said detecting means by leakage of lines of force from or into the cable.

18. A magnet having a core provided with a head, a pole piece rotatably mounted on said head and spaced therefrom, and roller bearings supporting said pole piece on the head.

19. A magnet for the purpose specified, comprising a metallic base, cores attached thereto, coils surrounding said cores, rotatable pole pieces mounted on and spaced from the cores, and roller bearings supporting the pole pieces on the cores.

20. A magnet for the purpose specified, comprising a metallic base, cores attached thereto, coils surrounding said cores, heads attached to said cores, rotatable pole pieces mounted on and spaced from the heads, and roller bearings supporting the pole pieces on the heads.

CHARLES W. BURROWS.